Oct. 7, 1952  S. E. ORLICKI, JR  2,612,931
TIRE INFLATING MEANS
Filed Oct. 12, 1949

Inventor
Stanley E. Orlicki, Jr.
By Clarence A. O'Brien
and Harvey B. Jacobson
Attorney Patented Oct. 7, 1952

2,612,931

UNITED STATES PATENT OFFICE 2,612,931

TIRE INFLATING MEANS

Stanley E. Orlicki, Jr., Chicago, Ill.

Application October 12, 1949, Serial No. 120,901

3 Claims. (Cl. 152—415)

1

This invention relates to new and useful improvements in vehicle wheels and the primary object of the present invention is to provide a tire inflating means that is located on a wheel so that a tire may be conveniently inflated regardless of whether the tire valve stem is disposed relatively close to a fender, wheel shield or ground.

Another very important object of the present invention is to provide a tire inflating means including a conduit attached to a tire valve stem and having an inlet valve that is detachably secured to a hub cap in a conveniently accessible position.

A further object of the present invention is to provide a tire inflating means including an extension for the valve stem of a tire and so constructed as to permit a tire to be removed from its rim without interference from the extension.

A still further aim of the present invention is to provide a tire valve stem extension that is simple and practical in construction, strong and reliable in use, small and compact in structure, relatively inexpensive to manufacture, and otherwise well adapted for the purposes for which the same in intended.

Other objects and advantages reside in the details of construction and operation as more fully hereinafter described and claimed, reference being had to the accompanying drawings forming part hereof, wherein like numerals refer to like parts throughout, and in which:

Figure 1:
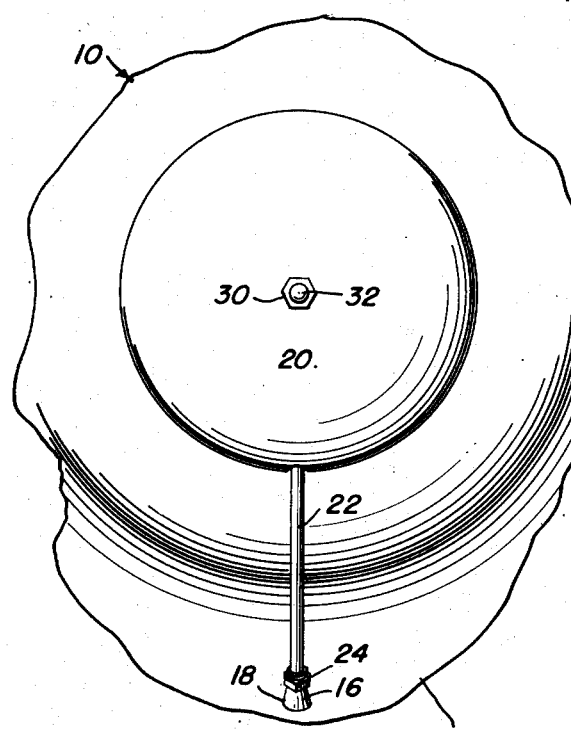
Figure 1 is a front elevational view of a vehicle wheel and showing the present invention applied to the valve stem and hub cap.

Referring now to the drawings in detail, wherein for the purpose of illustration, there is disclosed a preferred embodiment of the present invention, the numeral 10 represents a vehicle wheel generally including a rim 12 and a tire 14 encircling the rim 12. The tire 14 is provided with the conventional valve stem 16 that extends outwardly through an aperture 18 provided in the rim 12. The vehicle wheel 10 is also provided with a hub cap 20 that is detachably secured to the wheel disk 21 by any suitable means.

Journalled for rotation on one end of an elongated, preferably flexible, conduit 22 is an internally threaded coupling member or nut 24 that receivably engages the externally threaded end

2 portion of the valve stem 16. The innermost end of the conduit or tubular extension 22 receives an externally threaded tubular member 26 that is received in a central opening 27 provided in the hub cap 20.

A pair of lock nuts 28 and 30 are threaded on the tubular member 26 and bear against the inner and outer faces of the hub cap 20 in order to retain the tubular member 26 and conduit 22 relative to the hub cap 20. A suitable valve housing 32 is applied to the outer end of the tubular member 26 so that air may be forced through the conduit 22, the valve stem 16 and hence into the tire 14.

Figure 2:
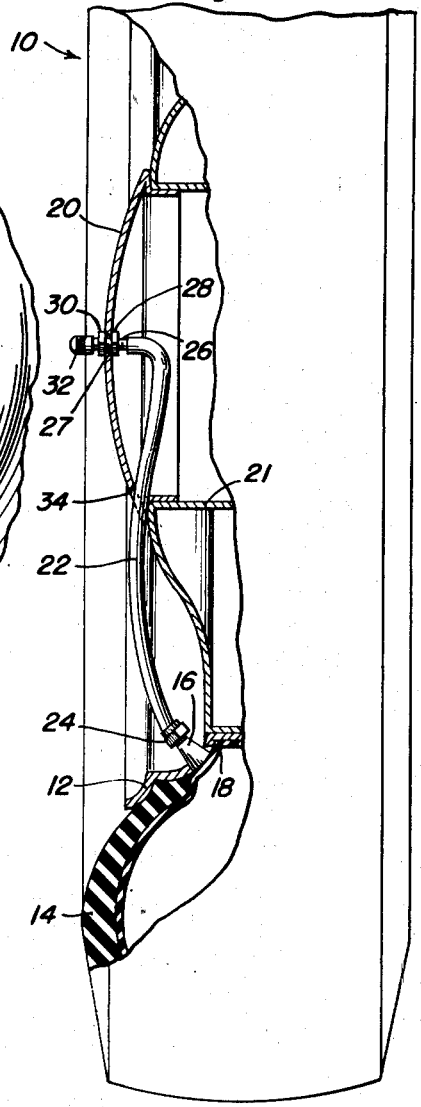
Figure 2 is an end view of Figure 1 and with parts broken away and shown in section for the convenience of explanation.
Figure 3:
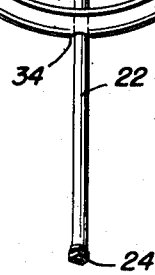
Figure 3 is an elevational view looking from the inside of the hub cap and showing the instant tire valve stem extension applied to the hub cap.

The hub cap 20 is also provided with a notch or opening 34 that receives the conduit 22 so that the upper portion of the conduit will be housed within the hub cap 20 as shown in Figures 2 and 3 of the drawings.

In practical use of the present invention, the extension 22 is applied to the valve stem 16 through the medium of the nut 24 and the tubular member 26 is attached to the hub cap 20 by the lock nuts 28 and 30. When it is desired to inflate the tire 14, a suitable air inflating means or conduit extending from a pump is applied to the nozzle or valve housing 32 to admit air into the tire 14.

Should the tire 14 become punctured and it is necessary to remove the same from the rim 12, the nut 24 is removed from the valve stem 16 permitting the valve stem 16 to pass through the aperture 18 during removing of the tire 14 from the rim 12. It is also possible to remove the extension 22 by removing the nut 24 from the valve stem 16 and disengaging the hub cap 20 from the wheel disk 21.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination with a vehicle wheel including a tire having a valve stem, and a snap type hub cap, of a tire inflating means comprising a conduit having first and second end portions, means at the first end portion of said conduit receivably engaging the valve stem, said hub cap having a central opening, an externally threaded tube at the second end of said conduit received in said opening, and a pair of lock nuts threaded on said tube and bearing against opposite sides of the hub cap, said hub cap also having a peripheral slot receiving the conduit and permitting the first end of the conduit to extend outwardly from the cap to engage the valve and the second end of the conduit to extend behind the cap.

2. In a vehicle whel including a disk having an opening, a hub cap having means engaged in the opening to retain the hub cap over the opening and a tire having a valve stem, a tire inflating means comprising a flexible conduit having first and second end portions, means at the first end portion of said conduit removably coupling said first end portion to the valve stem, said hub cap having a peripheral slot through which the first end portion extends outwardly from the cap, a threaded nipple carried by the second end portion of said conduit, said hub cap having a central opening in which said nipple is retained, said second end portion being located behind the cap.

3. As a new article of manufacture, a hub cap having a central opening and a peripheral slot, a flexible conduit having an end secured to the cap and retained in the opening, said conduit extending outwardly from the hub cap through the slot, and a valve stem engaging element on the other end of said conduit.

STANLEY E. ORLICKI, Jr.

REFERENCES CITED

The following references are of record in the file of this patent:

UNITED STATES PATENTS

| Number | Name | Date |
|---|---|---|
| 1,906,737 | Burgess | May 2, 1933 |
| 2,070,993 | McDonald | Feb. 16, 1937 |

FOREIGN PATENTS

| Number | Country | Date |
|---|---|---|
| 427,149 | Great Britain | Apr. 16, 1935 |